US006905098B2

(12) United States Patent
Tisol, Jr.

(10) Patent No.: US 6,905,098 B2
(45) Date of Patent: Jun. 14, 2005

(54) D-RING RETAINER

(75) Inventor: James S. Tisol, Jr., Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/632,304

(22) Filed: Aug. 1, 2003

(65) Prior Publication Data

US 2004/0099774 A1 May 27, 2004

Related U.S. Application Data

(60) Provisional application No. 60/428,074, filed on Nov. 21, 2002.

(51) Int. Cl.$^7$ ............................... F16L 3/08; F16L 3/12
(52) U.S. Cl. ........................ 248/74.1; 248/71; 248/73; 24/265 CD
(58) Field of Search .................. 24/115 K, 265 CD, 24/453, 297; 411/508, 509, 510, 913; 248/74.1, 74.3, 68.1, 60, 62, 63, 71, 73

(56) References Cited

U.S. PATENT DOCUMENTS

| | | | | | |
|---|---|---|---|---|---|
| 4,264,047 | A | * | 4/1981 | Nelson ........................ | 248/73 |
| 4,509,710 | A | * | 4/1985 | Cooper et al. ................. | 248/73 |
| 4,735,387 | A | * | 4/1988 | Hirano et al. .................. | 248/71 |
| 4,766,651 | A | * | 8/1988 | Kobayashi et al. ....... | 24/16 PB |
| 5,112,013 | A | | 5/1992 | Tolbert et al. .............. | 248/74.3 |
| 5,601,261 | A | * | 2/1997 | Koike ........................ | 248/71 |
| 5,601,262 | A | * | 2/1997 | Wright ....................... | 248/74.4 |
| 6,105,216 | A | * | 8/2000 | Opperthauser ............... | 24/459 |
| 6,171,014 | B1 | * | 1/2001 | Meyer ........................ | 403/397 |
| 6,394,695 | B1 | * | 5/2002 | Chausset ..................... | 403/397 |
| 6,749,157 | B2 | * | 6/2004 | Takeuchi ..................... | 248/71 |

FOREIGN PATENT DOCUMENTS

| | | |
|---|---|---|
| AU | 71677 74 A | 1/1976 |
| DE | 298 10 939 U1 | 8/1998 |
| FR | 2 730 871 A | 8/1996 |
| NL | 9 001 675 A | 2/1992 |

OTHER PUBLICATIONS

EP 03 257231 Search Report Dated Mar. 12, 2004.

* cited by examiner

Primary Examiner—Ramon O. Ramirez
Assistant Examiner—Amy J. Sterling
(74) Attorney, Agent, or Firm—Mark W. Croll; Paul F. Donovan

(57) ABSTRACT

A retainer for securing items to a wall of a vehicle that may be installed by the user without the use of special tools or fasteners. The retainer includes an upper component that is slidably mounted to a lower component through the use of mating rails. The upper component includes an integral ring for securing items thereto, such as cargo nets, and the lower component includes a retainer leg that may be snap-fitted into an opening formed in a vehicle wall. A release member on the lower component engages a rib on the upper component for locking the upper component to the lower component. By moving the release member to a disengaged position, the upper component may be slidably removed from the lower component. To remove the lower component from the opening in the vehicle wall, the lower component includes opposing leg fingers that when pressed cause the retainer leg to disengage from the opening in the vehicle wall.

15 Claims, 5 Drawing Sheets

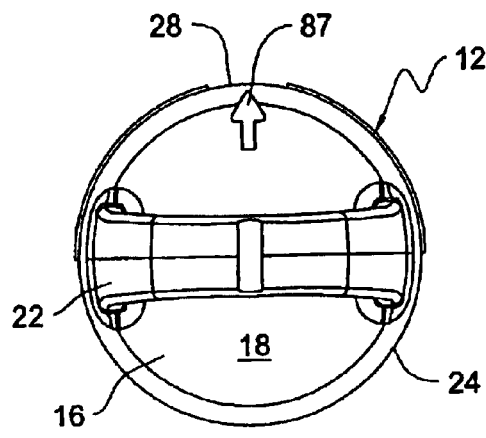
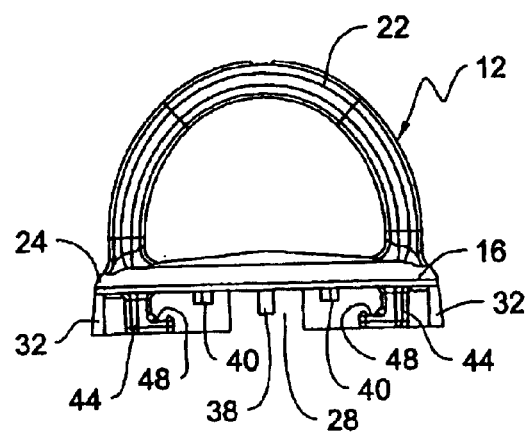
FIG. 6
FIG. 7
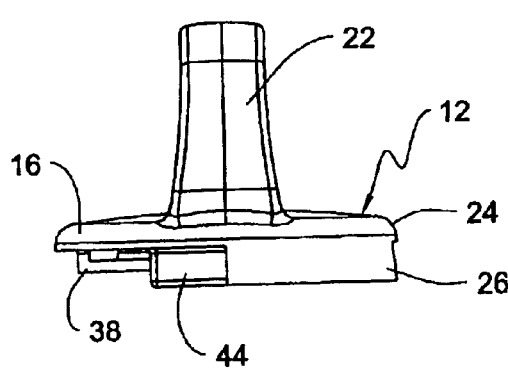
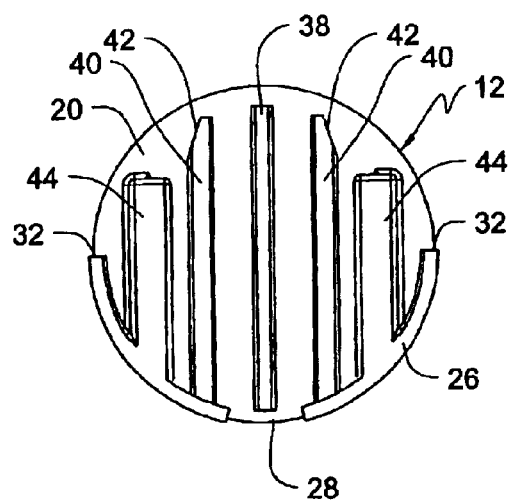
FIG. 8
FIG. 9

D-RING RETAINER

CROSS REFERENCE TO RELATED APPLICATION

This Non-Provisional Application claims benefit to U.S. Provisional Application Ser. No. 60/428,074 filed Nov. 21, 2002.

FIELD OF THE INVENTION

The present invention relates generally to devices for securing items within a vehicle and more particularly to removable retainers having an integral hook or ring for securing various items such as cargo nets to an interior wall of a vehicle.

BACKGROUND OF THE INVENTION

Various retainer devices are known to secure items to an interior wall of a vehicle. For example, it is known that various types of rings and hooks are used within a vehicle to secure items, such as cargo nets, to the vehicle's interior wall. Many of these devices are secured or otherwise anchored to the interior wall of the vehicle through the use of fasteners, pins, and the like. These known retainer devices, however, have several drawbacks. As an example, many of these retainer devices include multiple components, including metal or plastic hooks, mating components, and multiple fasteners, that are needed for the operation and securement of the retainer device. Moreover, these known retainers are installed by the vehicle manufacturer and typically require the use of special tools and several manufacturing and assembly steps. The present invention is directed at overcoming these and other known drawbacks and shortcomings with existing retainer devices.

SUMMARY OF THE INVENTION

The present invention is directed to a retainer device that is useful for securing items to a wall or other surface, such as an interior wall of a vehicle. The invention may be installed and removed by the user without the use of special tools or fasteners. The invention includes the use of two components—an upper component that includes a ring for mounting numerous types of items to the retainer, and a lower component that includes a leg that may be snap-fitted into an opening in the wall or other surface. The upper component may be slid onto the lower component and snapped into place. By operating a quick-release member, the upper component may be slid off of and removed from the lower component. Similarly, by operating a release member in the lower component, the lower component may be removed from the wall or Other features and advantages of the invention will become apparent to those skilled in the art upon review of the following detailed description, claims and drawings in which like numerals are used to designate like features.

BRIEF DESCRIPTION OF THE DRAWINGS

FIG. 6 shows a top plan view of the exemplary upper component of the invention of FIG. 5.

FIG. 7 shows a side view of the exemplary upper component of the invention of FIG. 5.

FIG. 8 shows another side view of the exemplary upper component of the invention of FIG. 5.

FIG. 9 shows a bottom view of the exemplary upper component of the invention of FIG. 5.

Figure 1:
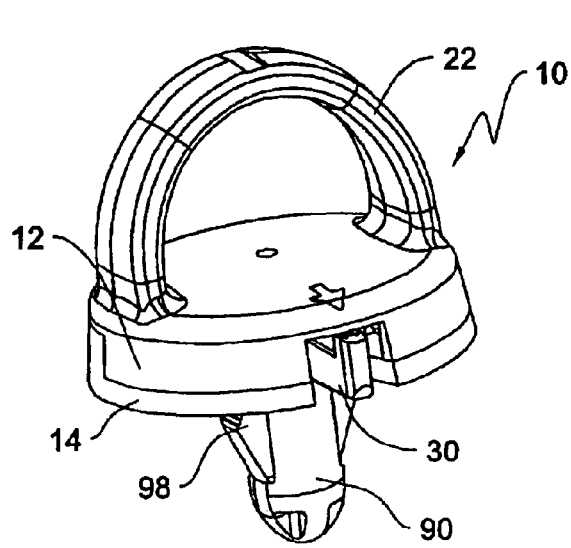
FIG. 1 shows an isometric view of an exemplary retainer of the present invention.
Figure 2:
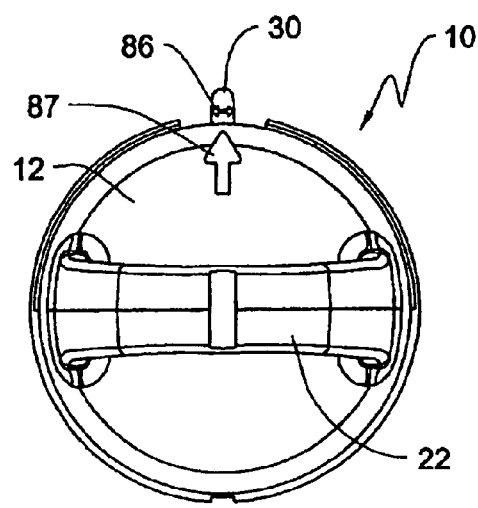
FIG. 2 shows a top plan view of the invention of FIG. 1.
Figure 3:
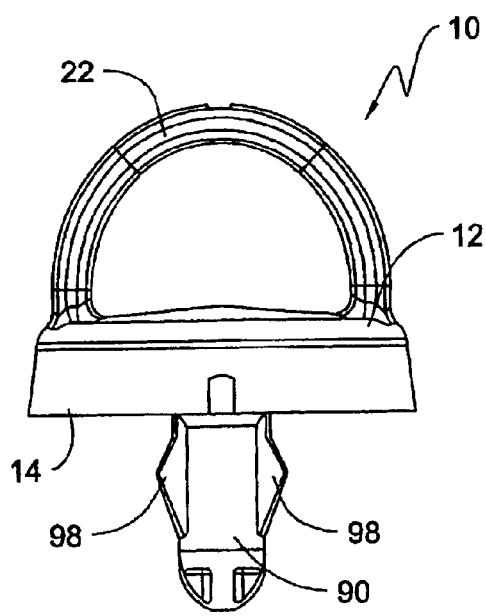
FIG. 3 shows a side view of the invention of FIG. 1.
Figure 4:
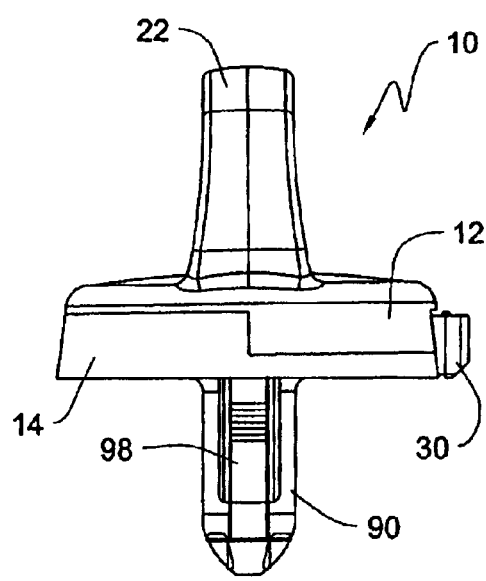
FIG. 4 shows another side view of the invention of FIG. 1.
Figure 5:
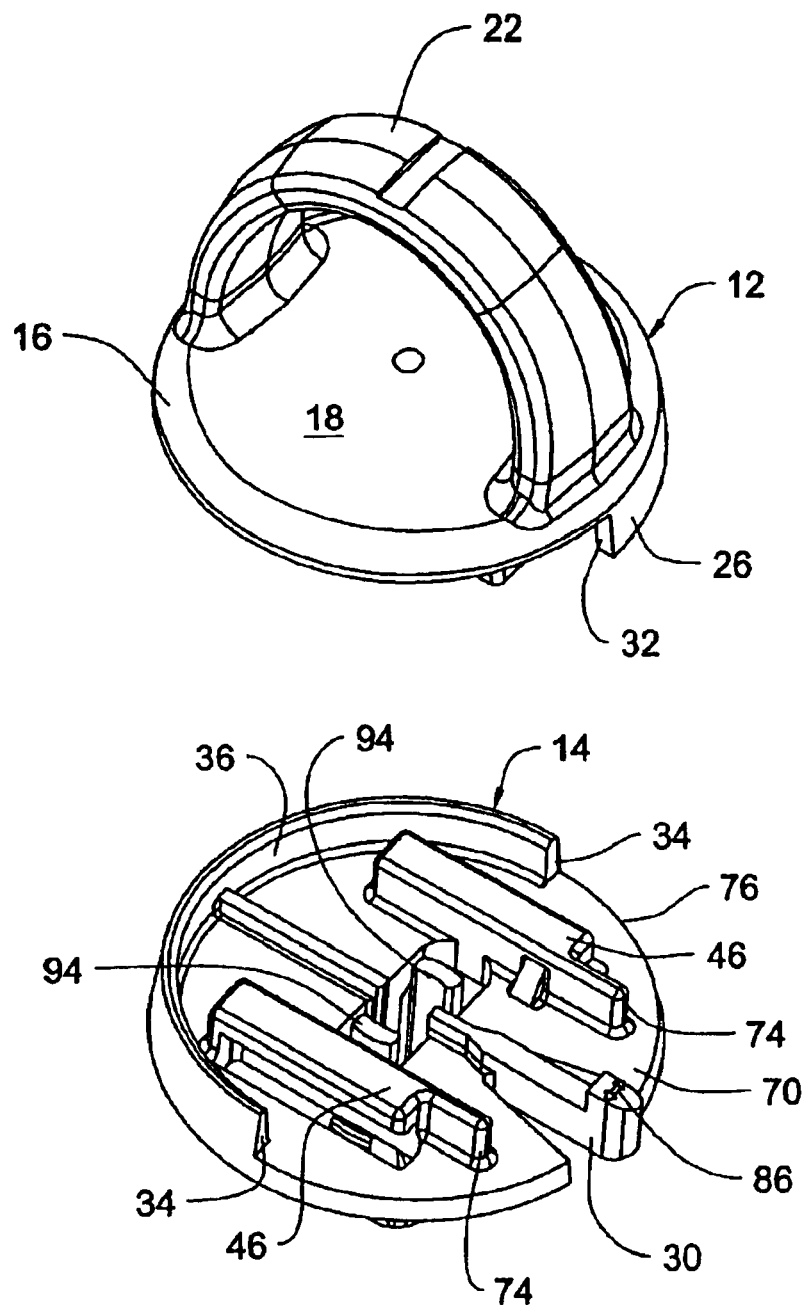
FIG. 5 shows an isometric view of exemplary upper and lower components of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof are meant to encompass the items listed thereafter and equivalents thereof as well as additional items and equivalents thereof.

DETAILED DESCRIPTION OF THE EMBODIMENTS

Referring to FIGS. 1–5, there is depicted a retainer 10 of the present invention. The retainer 10 includes an upper component 12 that is removably mounted to a lower mounting base 14. The retainer 10 of the invention may be snap-fitted into an opening or other aperture in a substrate, such as an opening in a vehicle interior wall, and may serve as an anchor to secure items within a vehicle, such as a cargo net, as discussed below. It should be understood that the retainer 10 not only is useful for securing items within a vehicle, but may also be used in numerous other applications where it is desired to secure items to a substrate or similar surface.

Referring to FIGS. 6–9, the upper component 12 includes an upper component base 16 that defines a top surface 18 and a bottom surface 20. Formed integral with the base 16 and extending outwardly from the top surface 18 is a ring or hook 22. The ring or hook 22 receives other rings, hooks, or similar means for securing attachments such as cargo nets to the upper component 12. As depicted, the top surface 18 of the upper component 12 is a relatively flat, planar surface and defines a peripheral edge 24 that is rounded or contoured to create a smooth surface transition from the top surface 18 to a downwardly extending side wall 26. As shown in FIGS. 7–9, the side wall 26 extends approximately half-way around the peripheral edge 24 of the upper component base 16 and defines a side wall opening 28 through which extends a release member or finger 30 of the lower mounting base 14, described below, for permitting selective removal of the upper component 12 from the lower mounting base 14. The side wall 26 includes terminating side wall ends 32 that will engage with terminating side wall ends 34 formed on the lower mounting base side wall 36 of the lower mounting base 14, as described below.

Referring to FIGS. 6–8, the ring or hook 22 extends outwardly from the top surface 18 of the upper component 12 near the peripheral edge 24. It should be understood that the ring or hook 22 may define numerous shapes and configurations, and may extend outwardly from the upper component 12 at numerous locations on the upper component 12 and still permit securement of another ring, hook, or other device thereto. As illustrated, the ring or hook 22 defines a rounded and smooth body, free of sharp edges and corners, to create an aesthetically pleasing appearance and a safe, non-abrasive mounting surface on which to mount or secure another ring, hook, or other device.

Referring to FIGS. 7–9, located on the bottom surface 20 of the upper component 12 are a plurality of ribs and rails for permitting the slidable alignment and mounting of the upper component 12 to the lower mounting base 14. Specifically, the upper component 12 includes a center rib 38 and a pair of opposing side ribs 40. The center rib 38 extends outwardly from the bottom surface 20, across the bottom surface 20 at or near the center of the bottom surface 20, and to the side wall opening 28 in the component side wall 26. As assembled with the lower mounting base 14, the center rib 38 interlocks with the release member or finger 30, which permits the selective, slidable removal of the upper component 12 from the lower mounting base 14. Positioned on opposite sides of the center rib 38 are the side ribs 40. Similar to the center rib 38, the side ribs 40 extend outwardly from the bottom surface 20 and across the bottom surface 20. The side ribs 40 assist in the slidable alignment of the upper component 12 with the lower mounting base 14 and prevent rotation of the upper component 12 relative to the lower mounting base 14. The side ribs 40 define a tapered end 42 to facilitate the slidable insertion of the upper component 12 to the lower mounting base 14.

Also located on the bottom surface 20 of the upper component 12 are a pair of opposing rails 44 that receive mating rails 46 extending outwardly from the lower mounting base 14, described below, to hold the upper component 12 to the lower mounting base 14. As illustrated by FIGS. 7, 11, 14, and 15, the rails 44 extend outwardly from the bottom surface 20, have generally an L-shaped cross-section, and define a rail groove 48 for slidably engaging with a mating rail rib 50 defined by the rails 46, described below, of the lower mounting base 14. The rail groove 48 and mating rail rib 50 assist in interlocking the rails 44 and 46 together. In addition, the rail groove 48 facilitates the slidable engagement of the rails 46 of the lower mounting base 14 to the rails 44 of the upper component 12. Referring back to FIGS. 7–9, similar to the center rib 38 and side ribs 40, the rails 44 extend across the bottom surface 20 of the upper component 12 and are aligned substantially parallel with the center rib 38 and side ribs 40. As depicted in FIG. 9, the rails 44, at one end, are formed integral with the side wall 26 to provide additional structural support for the rails 44. At the opposite end, the rails 44 define a rounded or contoured surface to assist with and facilitate the slidable alignment of the rails 46 of the lower mounting base 14 to the rails 44 of the upper component 12. It will be understood by those skilled in the art that other arrangements, configurations, alignments, and positions of the ribs 38, 40 and rails 44 extending outwardly from the bottom surface 20 of the upper component 12 are possible with the invention and yet facilitate the removable mounting of the upper component 12 to the lower mounting base 14.

Figure 10:
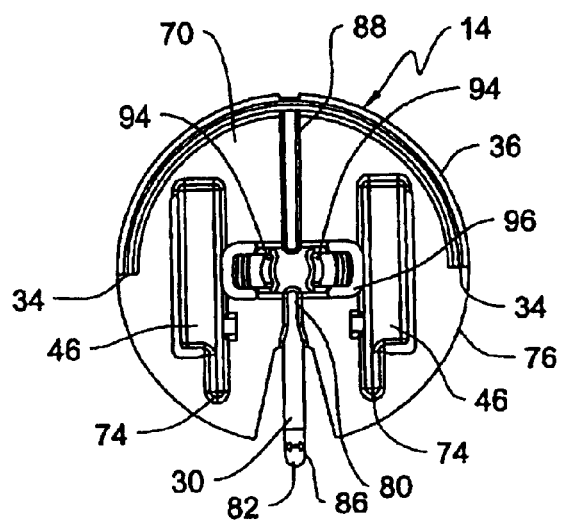
FIG. 10 shows a top plan view of the exemplary lower component of the invention FIG. 5.
Figure 11:
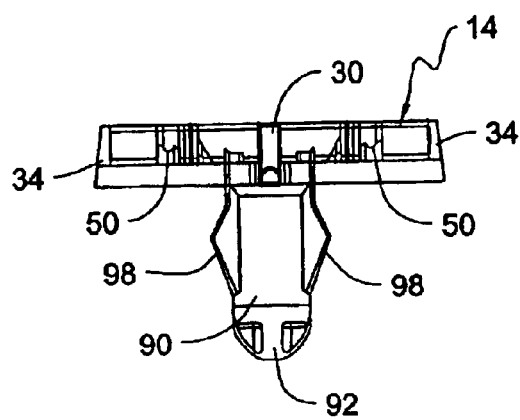
FIG. 11 shows a side view of the exemplary lower component of the invention of FIG. 5.
Figure 15:
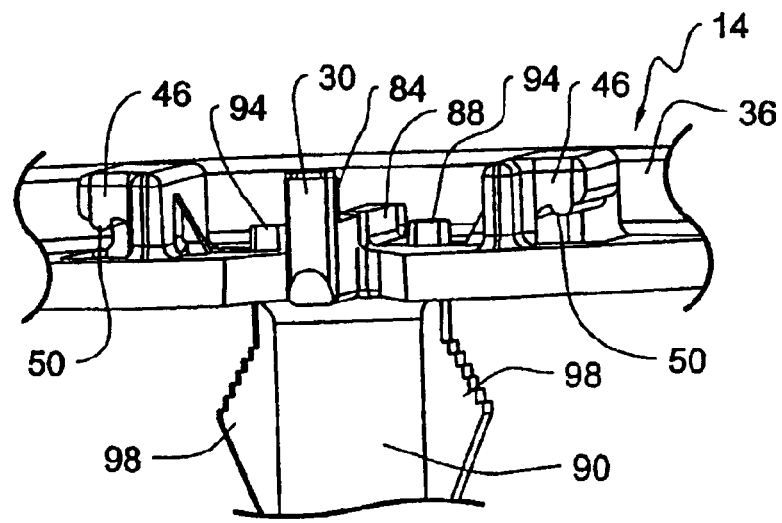
FIG. 15 shows a partial isometric view of the exemplary lower component of the invention of FIG. 5.

Referring to FIGS. 10–13, the lower mounting base 14 includes a top surface 70 and a bottom surface 72. Extending outwardly from the top surface 70 are the rails 46 that slidably engage with the mating rails 44 of the upper component 12. The rails 46 are positioned substantially parallel on the top surface 70 and have generally an L-shaped cross-section. As illustrated in FIGS. 11 and 15, each rail 46 includes a rail rib 50, which extends outwardly from the rail 46 and aligns and mates with the rail groove 48 of the rail 44 of the upper component 12. The rail rib 50 and rail groove 48 facilitate the interlocking of the rails 44 and 46. Referring back to FIG. 10, the rails 46 at rail end 74 define a rounded or contoured surface to assist with the slidable alignment of the mating rails 44 and 46. As above, it will be understood by those skilled in the art that other arrangements, alignments, configurations and positions of the rails 46 of the lower mounting base 14 are possible with the invention.

Figure 12:
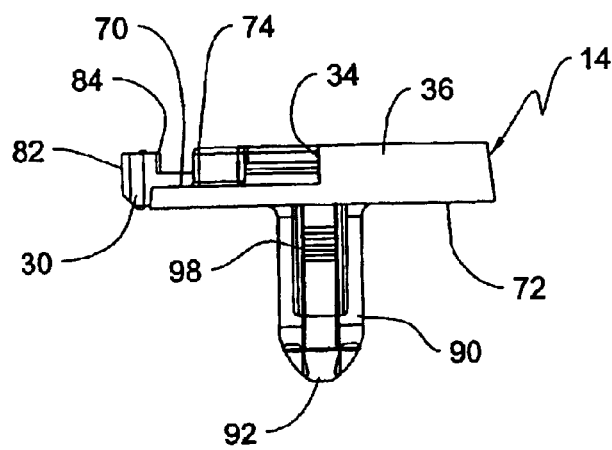
FIG. 12 shows another side view of the exemplary lower component of the invention of FIG. 5.

The lower mounting base 14 also defines a peripheral edge 76. Referring to FIGS. 10 and 12, extending outwardly from the top surface 70 at the peripheral edge 76 is the lower mounting base side wall 36 that extends approximately half-way around the peripheral edge 76 of the mounting base 14. The mounting base side wall 36 includes terminating side wall ends 34 that will engage with the terminating side wall ends 32 of the upper component side wall 26 upon the slidable insertion of the upper component 12 onto the lower mounting base 14. In other words, the component 12 is slidably mounted to the lower mounting base 14 along the mating rails 44, 46, until the terminating side wall ends 32, 34 contact each other, thereby stopping the slidable movement of the component 12 relative to the lower mounting base 14.

Referring to FIGS. 10–13, extending radially from the lower mounting base 14 is the release member or finger 30 that permits the selective, slidable removal of the upper component 12 from the lower mounting base 14. As depicted, the release finger 30 includes a secured end 80 that permits pivotable movement of the release finger 30, and a free end 82 defining an upwardly extending shoulder 84 that, when the release finger 30 is aligned with the center rib 38 of the upper component 12, serves to retain and lock the upper component 12 onto the lower mounting base 14. To unlock the upper component 12 from the mounting base 14, the release finger 30 may be moved tangentially at the free end 82, as indicated by direction arrow 86 in FIGS. 2, 5 and 10, until the shoulder 84 no longer aligns with the center rib 38. The upper component 12 may then be slidably removed from the lower mounting base 14, as indicated by direction arrow 87, depicted in FIGS. 2 and 6. Similarly, to install the upper component 12 onto the mounting base 14, the release finger 30 may be moved tangentially at the free end 82, as indicated by direction arrow 86, until there is suitable clearance for the center rib 38 of the upper component 12 to pass alongside the release finger 30. The upper component 12 is then slid onto the lower mounting base 14, via the mating rails 44, 46, until the terminating side wall ends 32, 34 contact each other, at which point the release finger 30 may be moved tangentially until the shoulder 84 of the release finger 30 aligns with the center rib 38. At this point, the upper component 12 is locked to the lower mounting base 14 by the release member or finger 30.

As assembled, the side ribs 40 of the upper component 12 may contact the side walls of the rails 46 to prevent rotation of the upper component 12 relative to the lower mounting base 14 to further secure the upper component 12 onto the lower mounting base 14. In addition, the center rib 38 of the upper component 12 aligns with a center rib 88, depicted in FIG. 10, positioned on the upper surface 70.

Figure 13:
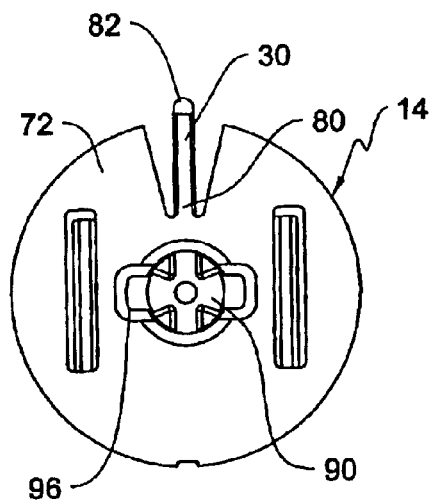
FIG. 13 shows a bottom view of the exemplary lower component of the invention of FIG. 5.
Figure 14:
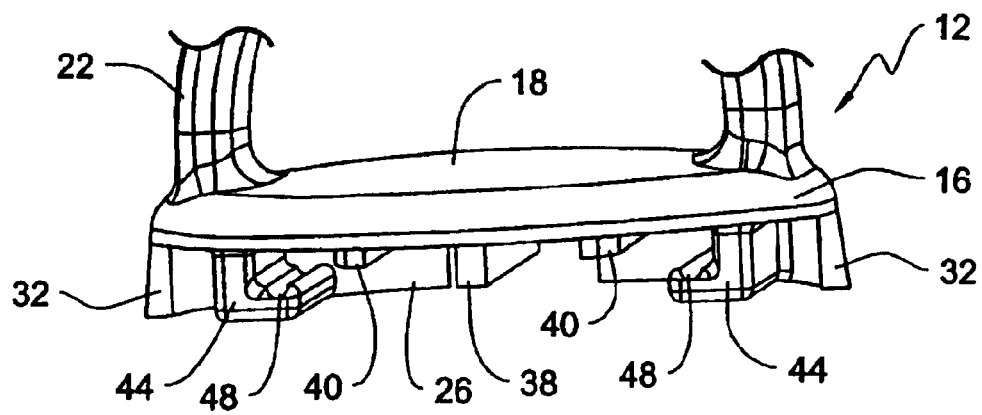
FIG. 14 shows a partial isometric view of the exemplary upper component of the invention of FIG. 5.

Referring to FIGS. 11–13, the lower mounting base 14 further includes a retainer leg 90 located central to the mounting base 14 for snap-fitting the retainer 10 of the invention to a hole or opening in a substrate, such as a wall or other surface. The retainer leg 90 extends outwardly from the bottom surface 72 of the lower mounting base 14. The retainer leg 90 has generally a cylindrical shaped body and a rounded end 92 to facilitate the insertion of the retainer leg 90 into the hole or opening in the substrate. Referring to FIGS. 10 and 15, extending from the retainer leg 90 are opposing retainer leg fingers 94 for permitting the removal of the lower mounting base 14 from the substrate, as described below. The retainer leg fingers 94 extend through a central opening 96, depicted in FIGS. 10 and 13, in the lower mounting base 14 and protrude above the upper surface 70, as illustrated by FIG. 15. As shown in FIGS. 11, 12 and 15, the retainer leg 90 also includes opposed ridged, inclined surfaces 98 that, when the retainer leg 90 is installed through the hole or opening in the substrate, the retainer leg 90 will snap-fit into the hole or opening and secure the lower mounting base 14 to the substrate by gripping the bottom surface of the substrate. To remove the lower mounting base 14 from the substrate or surface on which it is mounted, the leg fingers 94 may be pressed by hand toward each other, thereby releasing the engagement of the ridged, inclined surface 98 from the bottom surface of the substrate. The lower mounting base 14 may then be removed or pulled from the opening in the substrate.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A retainer for use in securing items within a vehicle comprising:
    a lower mounting iso having a mounting base upper surface and a mounting base lower surface mod defining a central opening, the lower mounting base including at least one rail extending outwardly from and across the mounting base upper surface, a release member extending radially outward from the central opening, and a retainer leg extending outwardly from the mounting base lower surface, and
    an upper component releasably mountable to the lower mounting base, the upper component having an upper surface and a lower surface, the upper component including at least one rail extending outwardly from and across the lower surface of the upper component for slidable engagement with the at least one rail of the lower mounting base, a central rib extending outwardly from and across the lower surface of the upper component for engagement with the release member, the release member having a fixed end and a free end, the free end being movable to permit the slidable release of the upper component from the lower mounting base, such that when released, the lower surface of the upper component is caused to slide across the mounting base upper surface of the lower mounting base, and an item-mounting member extending outwardly from the upper surface of the upper component for mounting items to the retainer.

2. The retainer as set forth in claim 1, wherein the retainer leg further includes opposing substrate-engaging surfaces.

3. The retainer as set forth in claim 2, wherein the upper component further includes a pair of side ribs extending outwardly from and across the upper component lower surface, the pair of side ribs are aligned substantially parallel with the central rib.

4. The retainer as set forth in claim 3, wherein the item-mounting member is a ring.

5. The retainer as set forth in claim 2, wherein the retainer leg further includes at least one leg finger that facilitates the insertion and removal of the lower mounting base within an opening in a substrate.

6. The retainer as set forth in claim 5, wherein the at least one leg finger extends through the central opening in the lower mounting base.

7. The retainer as set forth in claim 1, wherein the at least one rail of the upper component includes a rail groove.

8. The retainer set forth in claim 7, wherein the at least one rail of the lower mounting base includes a rail rib for engagement with the rail groove.

9. A retainer comprising:
    a first mounting member having a first body including a first surface and a second surface, at least one rail extending outwardly from and across the first surface, a release member extending from the first body, the release member including a free end and an end secured to the body that permits pivotable movement of the release member, and a retainer leg extending outwardly from the second surface for attaching the first mounting member to a mating object; and
    a second mounting member having a second body including a third surface and a fourth surface, at least one rail extending outwardly from and across the third surface, a rib extending outwardly from and across the third surface, and an item mounting member extending outwardly from the fourth surface for attaching items to the second mounting member, wherein the second mounting member is removably mountable to the first mounting member, such that to mount the second mounting member to the first mounting member, the second mounting member is caused to slide over the first mounting member by moving the release member of the first mounting member at its free end in a first direction until there is suitable clearance for the rib of the second mounting member to pass by the release member, and by further sliding the second mounting member over the first mounting member in such a manner that the at least one rail of the second mounting member slidably engages the at least one rail of the first mounting member, the second mounting member being slid over the first mounting member until such time as the release member passes the rib of the second mounting member at which point the release member is moved in a second direction so to be in alignment with the rib thereby locking the second mounting member to the first mounting member, and such that to unmount the second mounting member from the first mounting member, the release member is moved out of alignment with the rib, thereby allowing the second mounting member to be slidably removed from the first mounting member.

10. The retainer as set forth in claim 9, wherein the free end of the release member includes a shoulder that is adapted to align with the rib of the second mounting member when the second mounting member is locked to the first mounting member.

11. The retainer as set forth in claim 9, wherein the first directional movement of the release member is substantially parallel with the first surface of the first mounting member, and the second directional movement of the release member is in a substantially opposite direction to the first direction.

12. The retainer as set forth in claim 9, wherein the first mounting member includes a first peripheral side wall extending from the first surface and partially around the first body thereby defining first ends, and wherein the second mounting member includes a second peripheral side wall extending from the third surface and partially around the second body thereby defining second ends, such that the first ends of the first mounting member engage the second ends of the second mounting member upon the slidable insertion of the second mounting member onto the first mounting member.

13. The retainer set forth in claim 9, wherein the second mounting member includes at least one side rib extending outwardly from and across the third surface, such that when the second mounting member is mounted to the first mounting member, the at least one side rib of the second mounting member is adapted to contact the at least one rail of the first mounting member to prevent rotation of the second mounting member relative to the first mounting member to further secure the second mounting member onto the first mounting member.

14. The retainer as set forth in claim 9, wherein the at least one rail of the first mounting member includes two rails each having an "L" shaped cross-section, and wherein the at least one rail of the second mounting member includes two rails each having an "L" shaped cross-section, such that the rails of the second mounting member interlock with the rails of the first mounting member when the second mounting member is mounted to the first mounting member.

15. The retainer as set forth in claim 9, wherein the second peripheral side wall includes an opening through which extends the release member for permitting selective removal of the second mounting member from the first mounting member.

\* \* \* \* \*